Oct. 28, 1958   P. A. CRANDELL ET AL   2,858,535
MICROWAVE POLARIZATION APPARATUS
Filed July 29, 1955   2 Sheets-Sheet 1

INVENTORS
PAUL A. CRANDELL
JOHN B. LEVIN

BY Joseph Weingarten
ATTORNEY

Oct. 28, 1958   P. A. CRANDELL ET AL   2,858,535
MICROWAVE POLARIZATION APPARATUS
Filed July 29, 1955   2 Sheets-Sheet 2

INVENTORS
PAUL A. CRANDELL
JOHN B. LEVIN

BY Joseph Weingarten
ATTORNEY

United States Patent Office 2,858,535
Patented Oct. 28, 1958

2,858,535

MICROWAVE POLARIZATION APPARATUS

Paul A. Crandell, Bedford, and John B. Levin, Cambridge, Mass., assignors to Laboratory for Electronics, Inc., Boston, Mass., a corporation of Delaware Application July 29, 1955, Serial No. 525,097

12 Claims. (Cl. 343—756)

The present invention relates in general to radar apparatus and in particular to a radar antenna system capable of selectively improving the response from targets under observation relative to the return from various forms of clutter, such as precipitation, which would ordinarily tend to obscure the desired target when viewed on a radar screen.

It is well known that fog, snow, rain and other forms of precipitation will provide strong echoes, visible on the usual radar display. While this property is highly desirable and frequently utilized for meteorological purposes, it is one of the severest limitations of search radars attempting to locate targets, such as ships and planes, in the midst of precipitation disturbances. The immediate effect of precipitation return is to reduce the effective range of a particular radar, and in fact, it is not uncommon for the return echo of the desired target to be obliterated entirely in the return of the precipitation encompassing the target.

Evidently such clutter seriously impairs the effectiveness of ground-controlled approach radar systems, which are primarily needed during periods of low visibility, caused by precipitation disturbances.

It is well known that droplets of moisture in the atmosphere assume a shape which is substantially spherical. Because of the conducting properties of the moisture droplets, they act as reflectors to electromagnetic waves incident on their surfaces. The regularly-surfaced reflective properties thereof permit a high degree of cancellation of droplet echos by arranging a radar antenna to radiate circularly polarized energy, the same antenna being employed to receive the reflected signals. Cancellation will not obtain from irregularly surfaced targets, such as aircraft, because only a fraction of the energy reflected therefrom is circularly polarized of the proper rotation to effect cancellation.

One conventional method of obtaining a circularly-polarized radiated wave is to energize a circular horn fed by a circular wave-guide supplied with circularly-polarized energy. This generally results in a conical-shaped beam being radiated. While this beam shape is not objectionable in some search radars, it would not be satisfactory for use in a precision approach radar system wherein the desirable beam is of markedly different widths in orthogonal planes. This is illustrated in the copending application of Cole, Levin and Repella, Serial No. 487,372, filed February 10, 1955, and entitled Radar Guidance Apparatus. Furthermore, when precipitation cancellation is not required, it is to advantage to realize the increased range available from the same radiated power using linear polarization.

In a conventional ground-controlled approach radar having a search operating in conjunction with a separate X-band precision approach radar, the loss in range, which is a consequence of having the precision antenna system adjusted for radiating circularly polarized energy, may be overcome by a substantial increase in the radiated power, the rate of increased range at X-band with respect to an increase in power being relatively small. The increased expense and bulk resulting therefrom is small compared to the expense and bulk present in conventional units not equipped for radiating circularly polarized energy. However, in a light weight inexpensive X-band precision approach radar suitable for landing aircraft without an associated search radar, as described in the fore-mentioned copending application, the relative rise in expense and bulk of increasing the radiated power is substantial, tending to counter the advantages inherent in a lightweight, inexpensive P. A. R. system. Hence, the provision of means for selecting either circularly polarized radiation for maximum precipitation cancellation, or linear polarization for maximum range, is in itself a highly advantageous feature.

A typical poor visibility landing situation might involve first establishing radar contact with a jet aircraft 10 miles from touchdown. At this distance it is not unlikely that the aircraft would be beyond the precipitation disturbance whence there would be a need for maximum radar range, but no necessity for cancellation. Linear polarization is then the preferred choice. As the aircraft descends along the glide path, it simultaneously enters the region of precipitation disturbance and shortens the distance to touchdown. The need for maximum range is no longer present, but now accurate tracking of the aircraft would be enhanced by a substantial reduction of precipitation clutter. Means permitting immediate changeover from linear to circular polarization would thus be of considerable advantage in enabling an operator to continue accurate tracking of the aircraft in order to guide it to a safe landing. In the absence of means for reducing precipitation clutter or if the means for changing from linear to circular polarization were not substantially instantaneous, the danger exists that the operator will lose the target in the clutter with the result that the approach must be discontinued, introducing delays and dangers inherent therewith.

It is a primary object of this invention to provide means for substantially instantaneous selection of either circularly or linearly polarized energy for radiation from a precision approach radar antenna.

One method of providing beams suitable for use in a precision approach radar is to illuminate an antenna reflecting surface having an aspect ratio of $a:1$, that is, one of two orthogonal dimensions of the reflecting surface is "$a$" times the other, by a pyramidal horn which provides illumination with a Gaussian distribution differing in the two orthogonal dimensions of the reflecting surface. Heretofore, the maintenance of both proper illumination of an antenna reflecting surface to provide the proper beam shape and circularity of polarization has been unattainable.

An object of the invention is to illuminate an antenna reflecting surface in a manner whereby a beam of substantially circularly polarized energy will be radiated having a radiation pattern which is narrow in a first plane and considerably wider in a second plane orthogonal to said first plane.

Another object is to provide means for radiating energy of a selected polarization having a radiation pattern which remains unchanged when a different type of polarization is selected.

Another object is to provide an antenna reflecting surface which introduces substantially no distortion in circularity when reflecting circularly polarized high frequency energy into space, and matching the impedance of a waveguide energizing the device illuminating said surface with the impedance of free space.

A further object is to provide means for substantially instantaneous selection of either circularly or linearly polarized energy for radiation from a precision approach radar antenna, said means conveniently controlled by a precision approach radar operator without losing a target then tracked.

Another object of the invention is to achieve the foregoing objects by positioning the polarization-controlling elements on a mechanically oscillating antenna structure in a manner which minimizes the moment of inertia of the oscillating components.

In a broad form of the invention these and other objects and advantages are achieved by a novel combination which includes, means for energizing with high frequency energy, a turnstile junction having shorting stubs readily positioned into either one of two predetermined positions to provide energy with a predetermined polarization at the output of the junction. The energy from the junction is then appropriately coupled to pyramidal horn having a taper in a first plane which differs from the taper in a second plane orthogonal to said first plane, both planes being perpendicular to the longitudinal axis of symmetry of the horn. The mouth of the pyramidal horn is oriented to illuminate an antenna reflecting surface of a symmetrical mesh screening.

In one form of the invention a Teflon thin plastic covering is utilized to seal the mouth of the sectoral horn for the purposes of preventing elements of nature from entering therein. The means for coupling the horn to the turnstile junction is a special section of waveguide which provides a smooth transition from a circular cross section at the turnstile junction and a square cross section at the end in contact with the horn. The shorting stubs in the turnstile junctions may be readily moved from one of the two predetermined positions to the other, adjustable stops being provided for each position so that first and second positions of each stub may be initially set up for radiation respectively of circularly and linearly polarized energy. Thereafter, the subs may be returned to these positions by movement thereof until limited by the adjustable stops. A preferred form of changing the potion of each shorting stub includes a plunger which slides within a solenoid. One end of the plunger is attached to the shorting stub and the other end is connected to a spring having sufficient tension to hold the shorting stub in the first position determined by the first adjustable stop. When the solenoid is energized, the plunger is moved so that the shorting stub is in the second position determined by the second adjustable stop. Energization of the solenoids is controlled by a switch on the control panel near the operating position from which the landing aircraft is tracked.

In another form of the invention the coupling between the turnstile junction and the sectoral horn, in addition to the transitional guide, is a length of U-shaped and a length of straight waveguide, both sections being of square cross-section. This arrangement results in the turnstile junction and solenoids being positioned relatively close to the center of oscillation of the mechanically scanning antenna member, thereby reducing the moment of inertia of the oscillating system.

These and other objects and advantages will become apparent from the following specification taken with reference to the accompanying drawing in which.

Figure 1:
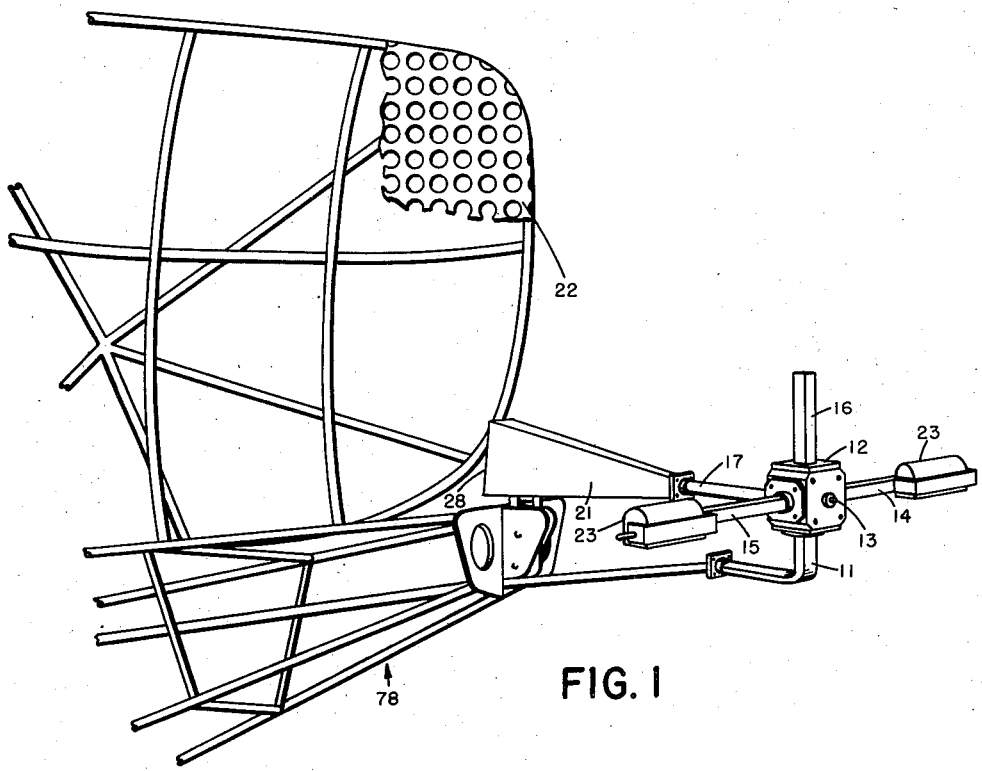
Fig. 1 is a perspective view of an embodiment of the invention.

A description of the physical arrangement of the apparatus illustrated therein facilitates understanding the interrelated functions of associated components. The apparatus described below is only one example of an embodiment of the novel concepts herein disclosed. Other examples thereof will become apparent to one skilled in the art. With reference now to Fig. 1, the flexible waveguide 11 from the transmitter-receiver (not shown) feeds the turnstile junction 12. Impedance matcher 13 is adjusted until each of the five guides 15, 11, 14, 16 and 17 are terminated at the junction with their characteristic wave impedance when all five guides are terminated at their respective ends away from the junction with their respective characteristic impedances. Guide 14 has an adjustable shorting stub inside such that the distance from the center of the junction to the shorting stub therein is substantially one-fourth the guide wavelength longer than the distance from the center of the junction to the adjustable shorting sub in guide 15. Guide 16 is terminated in a lossy element so that energy incident to the guide 16 is dissipated. Guide 17 is circular where it joints turnstile junction 12 and smoothly changes to a square cross-section where it joins feed horn 21. Feed horn 21 illuminates antenna surface 22 of a symmetrical mesh screen so that it efficiently radiates energy in accordance with the desired radiation pattern, regardless of the type of polarization.

Figure 2:
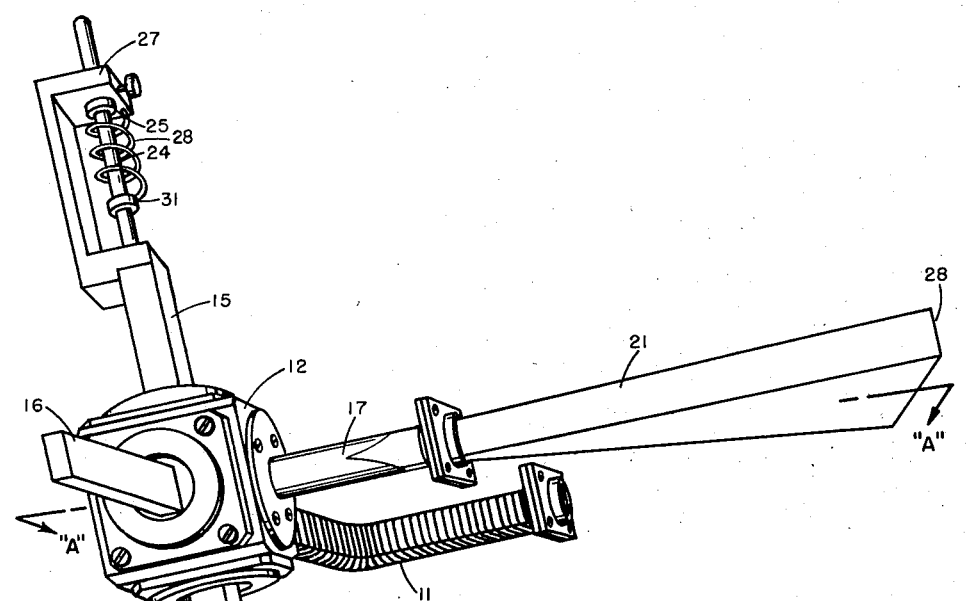
Fig. 2 is a perspective view of the antenna feed.

The solenoids 23 permit the shorting stubs in guides 14 and 15 to be remotely adjusted to provide radiated power which is substantially circularly polarized in one position of the shorting stubs and substantially linearly polarized in the other position. The element for remotely controlling the tuning stubs need not be limited to a solenoid. In the preferred embodiment shown, it is desired to radiate only two types of polarization, necessitating that each plunger be shifted between only two positions. A solenoid surrounding a spring-loaded plunger is especially suitable for this purpose. The springs 28 and 29 are illustrated in Fig. 2 as connected between end brackets 27 and 33 and stops 31 and 32, respectively, maintaining the plungers in the illustrated positions when the solenoids are deenergized. The remote switching could, of course, be accomplished by a motor, mechanical linkage, or any other suitable means.

In the functional description of the apparatus which follows, reference numerals of Fig. 1 have been carried over to Fig. 2 wherever applicable. Referring now to Fig. 2, a more detailed drawing of the turnstile junction, horn, and associated components is illustrated without the solenoids in order to clarify operational details. Energy enters the turnstile junction 12 from flexible rectangular guide 11, polarized with its electric vector parallel to the short dimension of guide 11. Half of this energy enters transition guide 17 as a first wave with its plane of polarization parallel to a plane formed by the longitudinal axes of symmetry of guides 16 and 17. The remaining half divides equally between guides 14 and 15 wherein it is reflected by the shorting stubs. All this reflected energy enters transition guide 17. None of the reflected energy enters guides 11 or 16 because the quarter-wave length difference between the distances from the turnstile center to the respective shorting stubs causes the reflected energy from guide 15 to travel a path one-half wavelength longer than that traveled by the energy from guide 14; as a result, the two equal-amplitude reflected waves arrive at the junctions with guides 11 and 16 oppositely phased, but reach the junction with guide 17 in phase. The reflected energy excites the transitional guide 17 with a second wave polarized in space quadrature to the first wave which arrived directly from guide 11. The time phasing between the two waves depends on the difference in path lengths travelled by the two waves. The path length of the second wave is adjusted by positioning the shorting stubs in guides 14 and 15, at all times ascertaining that the distance from the center of the turnstile junction 12 to the shorting stub in guide 14 is substantially one-fourth of the guide wavelength longer than the distance to the shorting stub in guide 14; that is, the movement of the two stubs may be considered as essentially ganged. By adjusting the stubs in this manner, the relative time phase between the two waves in space quadrature may be varied over all possible values.

Figure 3:
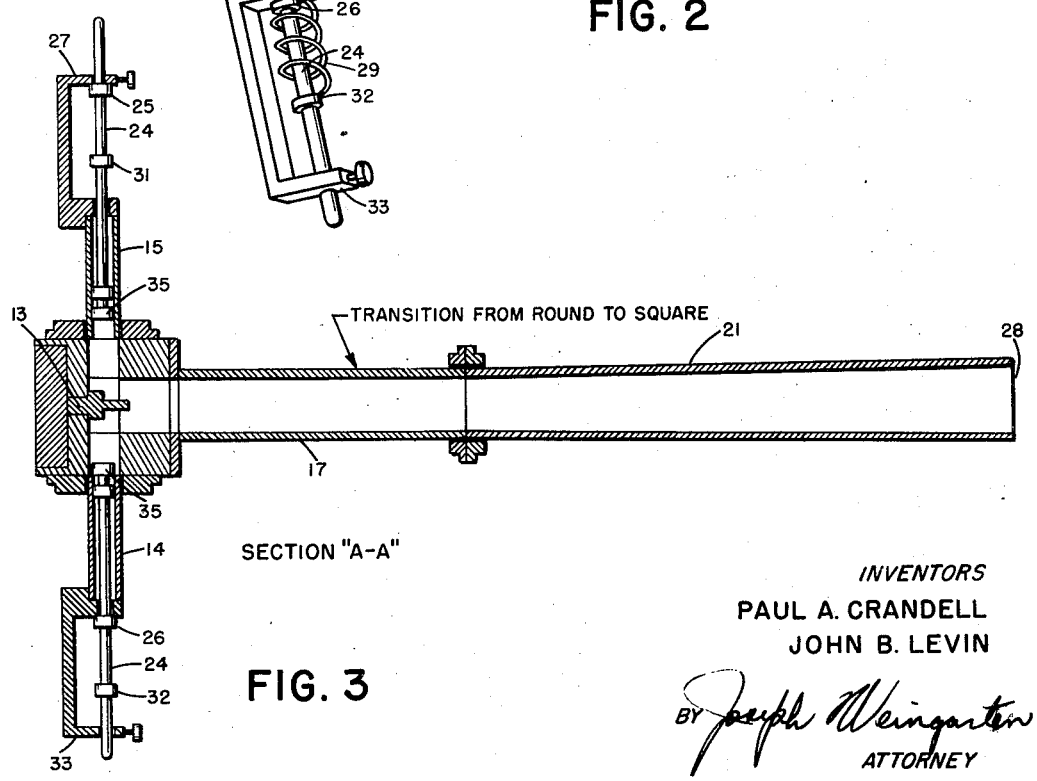
Fig. 3 is a drawing of section "A—A" of Fig. 2.

To facilitate understanding the positions of the various elements discussed above the view of section A of Fig. 2 is shown in Fig. 3. All the reference numerals of Fig. 1 and Fig. 2 have been carried over to Fig. 3 wherever applicable. In Fig. 3, the shorting stubs 35 are now clearly visible as is the impedance matching element 13. Note the slight taper in the pyramidal horn cross-section in this plane for matching the guide wave impedance to space and illuminating the antenna reflecting surface with the primary pattern to effect efficient radiation of a beam having the desired shape described above.

It is now appropriate to examine the types of polarization attainable at the output of the junction 12 where guide 17 is attached thereto. Although it takes more time for the second wave to reach guide 17, this wave carriers the same amount of power as the first wave but, in general, will be out of phase therewith. By adjusting the shorting stubs in the manner previously described, any polarization from linear through elliptical may be obtained at the input to guide 17. Because equal amplitude waves enter guide 17 in space quadrature, circular polarization will obtain when the waves are in time quadrature as well.

Note that guide 17 has a smooth transition from a circular cross-section at the turnstile junction to a square cross-section at the junction with horn 21 in order to maintain a proper impedance match between guide 17 and the turnstile junction. The symmetry of guide 17 is such that the time phase between the two waves does not change while passing through the transition from circular to square cross-section.

It is common practice to excite a pyramidal horn similar to horn 21 at a rectangular cross-section in only one mode such that the electric vector is parallel to the short dimension of the cross-section. In fact, the short dimension is normally designed so that a wave with its electric vector perpendicular to the short dimension will not propagate through the horn. In the present invention, the horn 21 is fed at a square cross-section with the two forementioned quadrature waves. It is designed so that both waves will propagate through the horn. However, the first wave with its electric vector parallel to the shorter dimension propagates with a different phase velocity than the second wave with its electric vector parallel to the longer dimension. As a result, the two waves are radiated from the mouth of horn 21 time-phased different from that upon leaving guide 17. The procedure for adjusting the shorting stubs in guides 14 and 15 to obtain the desired polarization will be described later. When these are adjusted to obtain maximum precipitation cancellation, the two waves at the mouth of horn 21 are in time quadrature as well as space quadrature and the resulting wave which illuminates antenna surface 22 is substantially circularly polarized. It was discovered that an antenna reflecting surface of symmetrical mesh screen 22 (Fig. 1) radiated the circularly polarized energy incident thereon, introducing substantially no distortion in the circularity thereof.

When the shorting stubs in guides 14 and 15 are adjusted to obtain maximum radar range with the available power, the two waves at the mouth of horn 21 are in space quadrature, but in time phase. The wave then radiated is linearly polarized with its resultant electric vector angularly displaced 45° from the electric vectors in each of the two space quadrature waves which are combined into the resultant. Hence, in general, the horn will be energized with elliptically polarized energy, the degree of ellipticity being related to the type of polarization selected for radiation.

By tapering the horn in both orthogonal planes mutually perpendicular to the horn longitudinal axis, both quadrature waves are well-matched to space. By radiating waves of equal power in space and time quadrature an extremely high degree of circularity of polarization is obtained, resulting in precipitation cancellation of a degree heretofore unobtainable while illuminating the antenna reflecting surface in a manner which provides a radiated beam having a radiation pattern of the type essential to effective operation of a lightweight precision approach radar. Furthermore, this radiation pattern remains unchanged when the radiated energy is linearly polarized.

Figure 4:
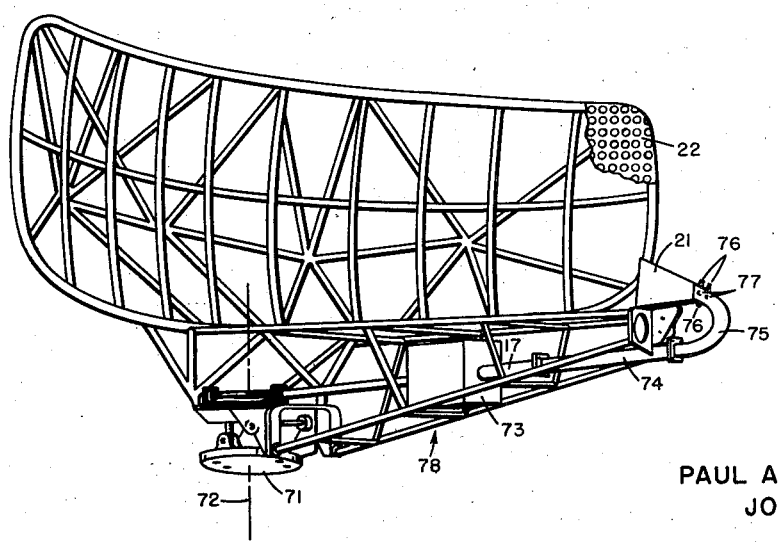
Fig. 4 is a perspective view of a component arrangement incorporating additional mechanical and electrical features.

While the foregoing apparatus achieves a number of objects set forth above, the arrangement illustrated in Fig. 4 incorporates additional features in addition to those already described which enhances the mechanical and electrical characteristics of the radiating system. These features will become apparent from the description which follows.

Referring to Fig. 4, there is illustrated a combination which not only provides selection of precipitation cancellation or maximum radiating range, but also features an arrangement of component parts relatively close to the center of oscillation of the scanning antenna so as to provide the desired selection of polarization with a minimum increase in the moment of inertia of the oscillating antenna structure. In addition, adjustable means are provided for improving the impedance match between free space and the guide energizing pyramidal horn 21 for both space-quadrature components of the radiated energy.

Disk 71 is attached to an oscillating member (not shown) of the antenna housing (not shown) in the manner described in the aforementioned copending application, thereby inducing oscillation of the entire structure of Fig. 4 about axis 72. In Fig. 1, the turnstile junction is shown at the very end of boom 78, the relatively large distance from the center of oscillation at axis 72 resulting in a substantial increase in the moment of inertia of the oscillating structure as compared to a structure not equipped with the junction.

In the arrangement of Fig. 4, however, case 73 encloses the entire turnstile junction assembly, including solenoids, except for transitional guide 17 which is seen to extend therefrom. Note that this assembly is now located relatively close to the center of oscillation at axis 72; hence, the increase in moment of inertia of the structure is inconsequential. This new arrangement incorporates a section of waveguide 74 and a U-shaped section of waveguide 75, both being of square cross-section, to couple the energy from transitional guide 17 to horn 21.

It will be observed that in U-shaped guide 74, near the end where the sectoral horn connects thereto, an arrangement of orthogonally oriented screw adjustments 76 and 77 are located. The screw adjustments 76, two at the top and one at the bottom, serve to improve the impedance match to free space of a wave in guide 75 having its electrical vector oriented substantially vertically therein. Opposite the screw adjustment 77 on the left side of guide 75 is another screw adjustment 77 similar to that on the bottom of the guide 75. The adjustments 77, then improves the impedance match to free space of the wave with its electrical vector oriented substantially horizontally in guide 75. This arrangement permits proper impedance match of guide-enclosed waves to free space to be obtained by employing a relatively simple procedure at the time of installation, the impedance match being thereafter maintained for all types of polarization. First, the guide section 74 is energized with a vertically polarized wave and the adjustments 76 set for a minimum standing wave ratio, indicating optimum impedance match to free space of a wave vertically polarized in the guide. In a similar manner the adjustments 77 are set with guide 74 energized by a horizontally polarized wave. The proper impedance match to space of both space quadrature components insures a high degree of circularity in the polarization of the energy when radiation to effect maximum precipitation cancellation is selected, while providing efficient power transfer to space in response to the selection of linear polarization, enabling realization of the maximum system range with the available radiated power.

To adjust the system for maximum precipitation cancellation, the system is coupled to a conventional radar transmitter and receiver. While the system directs energy on a three-bounce corner reflector, plungers 24 in guides 14 and 15 are adjusted until a minimum return from the reflector is received. Then stops 25 and 26 are tightened. This adjustment need only be made once. Thereafter, when precipitation cancellation is desired, the plungers 24 need only be moved until stop 25 rests against end bracket 27 and stop 26 rests against the end of guide 14.

When precipitation cancellation is not desired, plungers 24 are adjusted until a miximum return from the reflector is received and stops 31 and 32 are tightened. This adjustment also need only be made once. Thereafter, when precipitation cancellation is not desired and maximum target return is, the plungers 24 need only be moved until stop 32 rests against end bracket 33 and stop 31 rests against the end of guide 15. In the preferred embodiment, the plungers 24 are spring-loaded and moved from one position to the other by solenoids 23, controlled from a remote position convenient to the precision approach operator.

Measurements have shown that 50 db of precipitation cancellation may be readily obtained with this system. In an embodiment illustrated in Fig. 1, the VSWR with the horn energized by one quadrature component has been measured as 1.15, and 1.25 when the other quadrature component excites the horn, verifying the substantially identical impedance match between each wave and space. The embodiment of Fig. 4 properly adjusted reduces this already low VSWR to 1.02 for each component. The overall VSWR looking into the input of the turnstile junction measures to be 1.10 for linear polarization radiated and 1.18 for radiation of circular polarization, confirming the impedance matching properties of the components hereinabove described. In actual operation during a heavy rainstorm, a jet aircraft was guided to a safe landing with the apparatus adjusted for circular polarization at a time when the aircraft echo return was undiscernible from rain clutter with the equipment adjusted for linear polarization.

Thus the present invention provides a choice of a degree of precipitation cancellation heretofore unobtainable without sacrificing efficiency in illuminating an $a:1$ aspect-ratio antenna surface, or maximum range of the radar system with the same efficient illumination, either selection readily obtainable at the option of the operator. An operator can locate a target at a distant range with precipitation cancellation out. When the target approaches an area cluttered by precipitation, the operator can switch the precipitation canceller on and follow without difficulty the path of the target through the area of precipitation. This operational flexibility is achieved with a relatively small increase in weight, expense and moment of inertia of oscillating mechanical structures.

It is apparent that one skilled in the art can make numerous additions to and modifications of the particular embodiments described without departing from the novel concepts disclosed herein. Consequently, the present invention is to be construed as limited only by the spirit and scope of the appended claims.

What is claimed is:

1. Apparatus for radiating high frequency energy of a selected polarization comprising, a turnstile junction with adjustable shorting stubs each being selectively arranged in either first or second predetermined positions, means for applying high frequency energy thereto to provide first and second space quadrature waves displaced in time phase to an extent related to the position of said shorting stubs, a pyramidal horn having dissimilar tapers in orthogonal planes perpendicularly oriented with respect to the longitudinal axis of said horn, and means for applying said first and second waves to the input of said horn whereby with said stubs in said first position the polarization of energy emerging from said horn is such as to effect substantial precipitation cancellation, and with said stubs in said second position the polarization of energy therefrom is such that the amount of the latter energy reflected back to said horn is substantially maximized.

2. High frequency apparatus comprising, a turnstile junction having shorting stubs therein each being selectively arranged in either first or second predetermined positions respectively related to selection for radiation of linearly or circularly polarized energy and means for applying high frequency energy thereto, said stubs being arranged to provide at the output of said junction a pair of waves with their respective electric vectors being of substantially equal amplitude, oriented in space quadrature, and displaced in time phase by a first or second phase angle related to the position of said shorting stubs, a pyramidal horn having dissimilar tapers in orthogonal planes perpendicularly oriented with respect to the longitudinal axis of said horn, and means for applying said pair of waves to said horn, said dissimilar tapers being effective in changing the relative time phase of said pair of waves by a third phase angle, the sum of said first or second and said third angles being a multiple of 90 degrees, thereby selectively providing either linearly or circularly polarized high frequency energy at the output of said horn.

3. High frequency apparatus comprising, a turnstile junction having a pair of shorting stubs therein and means for applying high frequency energy thereto, each of said stubs being selectively arranged in either first or second predetermined positions to provide at the output of said junction a pair of waves with their respective electric vectors being of substantially equal amplitude, oriented in space quadrature, and displaced in time phase by either first or second phase angles respectively related to said first or second predetermined positions, a pyramidal horn having dissimilar tapers in orthogonal planes perpendicularly oriented with respect to the longitudinal axis of said horn, and means for applying said pair of waves to said horn, said dissimilar tapers being effective in changing the relative time phase of said pair of waves by a third phase angle, the sum of said first and third angles being an odd multiple of substantially 90 degrees, the sum of said second and third phase angles being an even multiple thereof, thereby selectively providing at the mouth of said horn either circularly or linearly polarized high frequency energy.

4. A radar antenna system for selectively providing radiated high frequency energy of either circular or linear polarization comprising, a turnstile junction having a pair of shorting stubs therein, a plunger attached to each shorting stub for adjusting the position thereof within said turnstile junction, for each plunger a pair of adjustable stops, each stop maintaining its associated plunger in either first or second predetermined positions related to the polarization of the energy to be radiated, a pyramidal horn having dissimilar tapers in orthogonal planes mutually perpendicular to the longitudinal axis of symmetry thereof and energized at a square cross-section by a transition guide which changes smoothly from a circular cross-section at one end connected to said turnstile junction to a square cross-section at the end connected to said horn, an antenna reflecting surface of symmetrical mesh screen, the mouth of said horn being oriented and dimensioned to illuminate said antenna surface in a manner whereby the radiated high frequency energy has a beam shape narrow in a first plane and considerably wider in a second plane orthogonal thereto.

5. Apparatus as in claim 4 and including a solenoid for each plunger proximate thereto, energization of said solenoid maintaining its respective plunger in said first predetermined position, and a spring connected to each plunger for maintaining said plungers in said second predetermined position when said solenoids are deenergized.

6. In a precision approach radar system a combination of apparatus for selectively providing radiated energy which is either circularly or linearly polarized comprising, a turnstile junction energized by a source of high frequency energy of predetermined wavelength, a pair of shorting stubs within said junction, for each stub a plunger attached thereto, for each plunger adjustable means for positioning each plunger in first and second preselected positions related to the type of polarization radiated, remote means for changing said plungers from one position to the other to change the polarization of the radiated energy, a pyramidal horn having dissimilar tapers in orthogonal directions mutually perpendicular to the direction of propagation of energy through said horn, means for coupling from said junction to said horn, waves in space quadrature having a time phase therebetween related to the position of said shorting stubs, said dissimilar tapers being effective in shifting the relative time phase between said space quadrature waves to provide energy of the selected polarization at the mouth of said horn, and an antenna reflecting surface of symmetrical mesh screen for preserving the polarization of energy incident thereon, said surface being illuminated by said horn.

7. In a precision approach radar system a combination of apparatus for selectively providing radiated energy which is either circularly or linearly polarized comprising, an oscillating framework for supporting an antenna surface and components associated therewith, a turnstile junction attached to said framework relatively close to the center of oscillation thereof and energized by a source of high frequency energy of predetermined wavelength, a pair of shorting stubs within said junction, for each stub a plunger attached thereto, for each plunger adjustable means for positioning each plunger in first and second preselected positions related to the type of polarization of the energy radiated, remote means for changing said plungers from one position to the other to change the polarization of the radiated energy, a pyramidal horn having dissimilar tapers in orthogonal directions mutually perpendicular to the direction of propagation of energy through said horn, means for coupling from said junction to said horn, waves in space quadrature having a time phase therebetween related to the position of said shorting stubs, said dissimilar tapers being effective in shifting the relative time phase between said space quadrature waves to provide energy of the selected polarization at the mouth of said horn, said horn illuminating said antenna surface, which is composed of symmetrical mesh screen for preserving the polarization of energy incident thereon.

8. Apparatus as in claim 7 wherein said remote means for changing said plungers from one position to the other includes a solenoid for each plunger to maintain its associated plunger in said first position when energized, and a spring connected to each plunger for maintaining its respective plunger in said second position when said solenoid is deenergized.

9. Apparatus as in claim 7 wherein said means for coupling said waves in space quadrature from said junction to said horn includes a transitional waveguide having a circular cross-section where connected to said junction smoothly changing to a square cross-section at the end opposite thereto, and a U-shaped waveguide of square cross-section connected to said transitional waveguide and said sectoral horn.

10. Apparatus as in claim 9 wherein said U-shaped waveguide includes first and second orthogonally oriented screw adjustments positioned near the end of said U-shaped waveguide which joins said pyramidal horn for providing independent adjustment of the impedance match between said U-shaped waveguide and free space for each of said waves oriented in space quadrature.

11. In a radar system radiating high frequency energy of a predetermined wavelength apparatus for providing either substantial precipitation cancellation or maximum target return echo comprising, a turnstile junction with first, second, third, and fourth coplanar similar waveguide sections, a fifth waveguide section orthogonal to said four coplanar waveguide sections, the axis of said fifth guide section intersecting the axes of said four coplanar guide sections in a common point, said first guide section opposite said third guide section, said second guide section opposite said fourth guide section, first and second shorting stubs within said second and fourth guides respectively, means for selecting one of two predetermined positions for each of said shorting stubs such that the distance between said common intersection point and said first shorting stub is substantially one-fourth the guide wavelength of said high frequency longer than the distance between said common intersection point and said second shorting stub, a pyramidal horn of square cross-sectional input flaring to a mouth of rectangular cross-section, said pyramidal horn connected to said turnstile junction by said fifth guide section, said fifth guide section of circular cross-section where joining said turnstile junction smoothly changing to a square cross-section where joining said sectoral horn, and an antenna surface of a symmetrical mesh screen, said pyramidal horn illuminating said antenna surface.

12. High frequency apparatus comprising, a turnstile junction having a pair of shorting means associated therewith and means for applying high frequency energy thereto, each of said shorting means being selectively arranged in either first or second predetermined positions to provide at the output of said junction a pair of waves having respective electric vectors of substantially equal amplitude while being oriented in space quadrature and being displaced in time phase by either first or second phase angles respectively related to said first or second predetermined positions, a pyramidal horn having dissimilar tapers in orthogonal planes perpendicularly oriented with respect to the longitudinal axis of said horn, and means for applying said pair of waves to said horn, said dissimilar tapers being effective in changing the relative time phase between said pair of waves by a third phase angle, the sum of said first and third angles being an odd multiple of substantially 90 degrees, the sum of said second and third phase angles being an even multiple thereof, thereby selectively providing at the mouth of said horn either circularly or linearly polarized high frequency energy.

References Cited in the file of this patent

UNITED STATES PATENTS

| | | |
|---|---|---|
| 2,611,087 | Alford | Sept. 16, 1952 |
| 2,686,901 | Dicke | Aug. 11, 1954 |
| 2,703,842 | Lewis | Mar. 8, 1955 |